(12) United States Patent
Kita et al.

(10) Patent No.: US 7,426,306 B1
(45) Date of Patent: Sep. 16, 2008

(54) EFFICIENT USE OF KEYFRAMES IN VIDEO COMPRESSION

(75) Inventors: David B. Kita, Milpitas, CA (US); Tser-Yuan Brian Yang, Livermore, CA (US); Dylan SeLegue, Milpitas, CA (US)

(73) Assignee: Altera Corporation, San Jose, CA (US)

( * ) Notice: Subject to any disclaimer, the term of this patent is extended or adjusted under 35 U.S.C. 154(b) by 617 days.

(21) Appl. No.: 10/692,286

(22) Filed: Oct. 23, 2003

Related U.S. Application Data

(60) Provisional application No. 60/421,217, filed on Oct. 24, 2002.

(51) Int. Cl.
*G06K 9/36* (2006.01)

(52) U.S. Cl. .......................... 382/238; 386/95; 386/111

(58) Field of Classification Search ................. 382/238, 382/239, 358, 348; 375/240, 358, 348, 951; 345/951, 725; 348/725; 378/951
See application file for complete search history.

(56) References Cited

U.S. PATENT DOCUMENTS

| | | | | |
|---|---|---|---|---|
| 6,021,250 A | * | 2/2000 | Hyodo et al. ................. | 386/95 |
| 6,122,662 A | * | 9/2000 | Emura ........................ | 709/219 |
| 6,400,768 B1 | * | 6/2002 | Nagumo et al. ........ | 375/240.18 |
| 6,567,471 B1 | * | 5/2003 | Yoshinari ................ | 375/240.26 |
| 6,600,786 B1 | | 7/2003 | Prakash et al. | |
| 6,940,909 B2 | * | 9/2005 | Linzer .................... | 375/240.25 |
| 2002/0071485 A1 | * | 6/2002 | Caglar et al. ........... | 375/240.01 |
| 2004/0017851 A1 | * | 1/2004 | Haskell et al. ......... | 375/240.16 |
| 2004/0042548 A1 | * | 3/2004 | Yu et al. ................. | 375/240.03 |

FOREIGN PATENT DOCUMENTS

WO    WO 00/77735 A1    12/2000

\* cited by examiner

*Primary Examiner*—Brian Q Le
*Assistant Examiner*—Claire Wang
(74) *Attorney, Agent, or Firm*—Okamoto & Benedicto LLP

(57) ABSTRACT

One embodiment disclosed relates to a method for encoding and decoding a video sequence in which a keyframe is used to bi-directionally predict frames in the sequence. The keyframe is coded independently of other frames in the sequence. Both a prior frame occurring before the keyframe and a subsequent frame occurring after the keyframe are predicted using data from the keyframe. Another embodiment disclosed relates to a method for allocating bits to a keyframe during video encoding. Effects of a plurality of keyframe bit allocations on quality of a predicted frame are measured. Said effects are used to determine a near optimal keyframe bit allocation.

8 Claims, 3 Drawing Sheets

Forward predicting P frames

Bi-directionally predicting B frames

EFFICIENT USE OF KEYFRAMES IN VIDEO COMPRESSION

CROSS-REFERENCES TO RELATED APPLICATIONS

The present application claims the benefit of U.S. Provisional Application No. 60/421,217, entitled "Optimized Use of Keyframes in Video Compression," filed Oct. 24, 2002, by David B. Kita et al., the disclosure of which is hereby incorporated by reference.

BACKGROUND OF THE INVENTION

1. Field of the Invention

The present invention relates generally to image and video processing and more particularly to the use of keyframes during video encoding and decoding.

2. Description of the Background Art

For a variety of reasons, video data (i.e., data representative of a sequence of video image frames) often requires compression. The compression may be needed to comply with bandwidth constraints, storage constraints, or other constraints.

As an example of a bandwidth constraint, a viewer might want to receive a video stream over an Internet connection having limited bandwidth at some point between the video source and the viewing device. Where the connection to the viewing device has less bandwidth than is required for uncompressed video (such as a 380 Kilobit per second DSL line trying to download a 4 Megabit per second DVD quality movie) or where the allotted bandwidth must be shared among many devices (such as a broadband channel used for many simultaneous video-on-demand sessions) or among many applications (such as e-mail, file downloads and web access), the video data would need to be compressed if the video data is to be received at the receiver in a timely manner.

Applications for compressed video over limited bandwidth include video streaming over the Internet, video conferencing, and digital interactive television. Satellite broadcasting and digital terrestrial television broadcasting are also examples of how bandwidth limitations can be dealt with using video compression. For example, using half the bandwidth allows one to double the number of channels broadcast on a satellite television network. Alternatively, using half the bandwidth may reduce the cost of these systems considerably.

Storage for video data might also be constrained. For example, a video sequence might need to be stored on a hard disk where the storage space required for uncompressed video is greater than the size of the available storage on the hard disk. Examples of devices requiring video storage include video-on-demand servers, satellite video sources, personal video recorders ("PVRs", often referred to as "digital VCRs"), and personal computers. Other digital storage media can be used for video storage, such as DVDs, CDs and the like.

Compression allows video to be represented with fewer bits or symbols than the corresponding uncompressed video. It should be understood that a video sequence can include audio as well as video information, but herein compression is often discussed with reference to manipulation of just the video portion of such information. When video (or any other data) is compressed, it can be transmitted using less bandwidth and/or less channel time and it can be stored using less storage capacity. Consequently, much effort has gone into compression methods that achieve high compression ratios with good results. A compression ratio is the ratio of the size (in bits, symbols, etc.) of uncompressed data to the corresponding compressed data. Compression where the data can only be recovered approximately is referred to as "lossy" compression, as opposed to perfectly recoverable, or "lossless," compression.

A compression system typically includes an encoder, a decoder and a channel for transmitting data between the two. In the case of a transmission system, the encoder encodes uncompressed data and transmits compressed data over the channel to the decoder, which then decompresses the received compressed data to recover the uncompressed data, either exactly (lossless) or approximately (lossy). Presumably, the channel has a limited available bandwidth requiring compression to handle the volume of data, but a limited channel is not required for compression to be used. In the case of a storage system, the encoder encodes uncompressed data and stores the compressed data in storage. When the data is needed (or at other times), the decoder recovers the uncompressed data (exactly or approximately) from the compressed data in storage. In either case, it should be understood that for compression to work, the encoder must convey via the compressed data enough information to allow the decoder to, at least approximately, reconstruct the original data.

A video sequence is often represented by a set of frames wherein each frame is an image and has a time element. The video sequence can be viewed by displaying each frame at the time indicated by its time element. For example, the first frame of a video sequence might be given a time element of 00:00:00:00 and the next frame given a time element of 00:00:00:01, where for example the rightmost two digits in the time element represent increments of $\frac{1}{30}$th of a second (and the other pairs of digits may represent hours, minutes, and seconds). Where the video sequence is a digitized, two-dimensional sequence, each frame can be represented by a set of pixels, where each pixel is represented by a pixel color value and a location in a (virtual or otherwise) two-dimensional array of pixels. Thus, an uncompressed video sequence can be fully represented by a collection of data structures for frames, with a data structure for a frame comprising pixel color values for each pixel in the frame. In a typical application, a pixel color value might be represented by 24 bits of data, a frame represented by a 1024×768 array of pixels, and one second of video represented by 30 frames. In that application, 24×1024×768×30=566,231,040 bits (or approximately 71 megabytes) are used to represent one second of video. Clearly, when video sequences of significant length are desired, compression is useful and often necessary.

Most video compression schemes attempt to remove redundant information from the video data. Video sequences will often have temporal redundancy and spatial redundancy. Temporal redundancy occurs when the scenery (e.g., the pixel color values) is the same or similar from frame to frame. Spatial redundancy occurs when the pixel color values repeat (or are similar) within a frame. Most video signals contain a substantial amount of redundant information. For example, in a television news broadcast, only parts of the head of the speaker change significantly from frame to frame and most objects in the background remain stationary. If the scene is two seconds long, the sequence may well contain sixty repetitions of the representations of stationary portions of the scene.

In addition to eliminating redundancy, some video compression schemes also seek to eliminate superfluous information, such as information that is present in the uncompressed video but which can be eliminated without altering the video sequence enough to impair its visual quality. For example, some high spatial frequency effects can be eliminated from many video sequences, allowing for greater compression ratios, without substantially reducing the quality of the video sequence.

Spatial redundancy can be analyzed and reduced on a frame by frame basis (i.e., without needing to take into account other frames) using what is often referred to as "still-image compression," since the processes used to compress single still images can be used. Examples of existing still-image compression include the Joint Photographic Experts Group (JPEG) standard, wavelet compression, and fractal compression. Quite often, reduction of spatial redundancy alone is not sufficient to get to desirable compression ratios for video. Additionally, features that are lost in the compression of some frames may appear in other frames resulting in flickering as features appear and disappear as each frame is displayed.

A common approach to reduction of temporal redundancy is to include a still image compression of a reference frame in the compressed data, followed by information for one or more subsequent frames conveying the differences between each subsequent frame and the reference frame. The reference frame is said to be "intra-coded" while subsequent frames are said to be "predicted." Intra-coded frames are often called "I-frames" or "keyframes," while predicted frames are sometimes referred to as "P-frames." Periodically, or according to some rule, a new keyframe is generated and used as the comparison for later subsequent frames. In some cases, subsequent predicted frames may not reference a keyframe directly but may instead reference previous predicted frames. Additionally, some predicted frames may reference P-frames or I-frames that occur either previously or subsequently in the sequence. Such bi-directionally predicted frames are commonly referred to as "B-frames" to distinguish them from "P-frames," which are predicted from one direction only.

One approach to representing a predicted frame with fewer bits or symbols is block matching, a form of temporal redundancy reduction in which blocks of pixels in the predicted frame are compared with blocks of pixels in the referenced frame(s) and the compressed predicted frame is represented by indications of matching blocks rather than pixel color values for each pixel in the predicted frame. With block matching, the predicted frame is subdivided into blocks (more generally, into polygons), and each block is tracked between the predicted frame and the referenced frame(s) and represented by a motion vector. When more than one referenced frame is used and the referenced frame cannot be identified by context, the predicted frame might be represented by both a motion vector and an indication of the applicable referenced frame for each constituent block. A motion vector for a block in an N-dimensional video frame typically has N components, one in each coordinate space, where each component represents the offset between the block in a referenced frame and a predicted frame, but a motion vector can be any other suitable form of representation, whether or not it falls within the mathematical definition of a vector.

The MPEG standards, created by the Moving Pictures Experts Group, and their variants are examples of compression routines that use block matching. An MPEG encoder encodes the first frame in its input sequence in its entirety as an intra-frame, or I-frame, using still-image compression. The intra-frame might be compressed by having the frame divided into 16 pixel by 16 pixel blocks and having each of those blocks encoded. A predicted frame is then encoded by indicating matching blocks, where a block in the predicted frame matches a block in the intra-frame and motion vectors are associated with those blocks.

In most cases, a predicted frame cannot be reconstructed just from knowledge of the referenced frame(s), block matches and motion vectors. A coarse approximation of the predicted frame might be reconstructed by starting with a blank image and copying each matching block from a referenced frame, shifting the relative position of each block according to the associated motion vector. However, gaps will remain where pixels of the predicted frame did not match any block in the reference frame(s) and differences might still exist where the blocks did not match exactly. Gaps are to be expected, such as where the scene captured in the video sequence is of a first object passing in front of a second object. If the second object is occluded in the referenced frame but not in the predicted frame, then there will be no matching information in the referenced frame that would allow for reconstruction of the predicted frame pixels that are associated with the second object.

One way to handle such problems is to run the block-matching process, determine what is left out and encode that as "residue". For example, a predicted frame can be encoded as a set of block elements, where each block element represents a block from a referenced frame and an associated motion vector, and a residue correcting the pixels of the predicted frame that are not represented (or are not represented correctly enough) by the block information. In MPEG encoding, the residue is encoded using JPEG.

Block matching is suboptimal in that it fails to take advantage of known physical characteristics or other information inherent in the images. The block method is both arbitrary and inexact, as the blocks generally do not have any relationship with real objects in the scene represented by the image. For example, a given block may comprise a part of an object, a whole object, or even multiple dissimilar objects with unrelated motion. Additional inefficiencies occur because the resultant residues for block-based matching are generally noisy and patchy, making them difficult to compress.

Segmentation followed by segment matching often provides better compression ratios than block matching because segments can be encoded more tightly than arbitrary blocks and segment matching leaves less of a residue. As used herein, a "segment" refers to a representation (or designation) of a set of pixels of an image, and a region of the image might also be referred to as a segment. Typically, a "segment" refers to a representation (or designation) of a set of pixels of an image where the pixels within a given segment have color values that are within a narrow range of variation and where pixels typically have wider variations across segment boundaries. Thus, dividing an image into segments of variable sizes and shapes allows for truer representations of image objects and thus eliminates many of the inefficiencies associated with block-based compression.

Another patent application in the same general technology area is U.S. patent application Ser. No. 09/550,705, filed Apr. 17, 2000 and titled "Method and Apparatus for Efficient Video Processing" (hereinafter "Prakash I"). Prakash I discusses a method for compressing a video sequence using segmentation. As part of the encoding process, motion vectors are calculated that represent displacements of segments from one image frame to a subsequent image frame. These motion vectors are then included in the compressed data so that a decoder can use the information to reconstruct the second image frame. Segmentation information need not be included in the compressed data if the decoder can extract the segmentation information from other data. For example, the decoder can extract segmentation information by segmenting a keyframe (or another predicted frame that the decoder has already reconstructed). Preferably, the encoder uses the same segmentation process as the decoder. For a further discussion, please refer to Prakash I. With segmentation and segment matching, a predicted frame can be represented by a set of segment matches, wherein each segment match references a segment of a referenced frame and a motion vector indicating the offset of the segment between the referenced frame and the predicted frame.

In both block-based and segment-based compression strategies, keyframes are used as reference points for subsequent predicted frames. A typical arrangement of I-frames, P-frames, and B-frames, as for instance may appear in an MPEG-encoded video sequence, is $I_1, B_1, B_2, P_1, B_3, B_4, P_2, B_5, B_6, P_3, B_7, B_8, P_4, B_9, B_{10}, I_2, \ldots I_1$ is used to predict $P_1$, $P_1$ is used to predict $P_2$, and so on, and the B-frames lying in between are predicted bi-directionally from the nearest I- or P-frames. Because of the dependencies inherent in this prediction order, this sequence must actually be decompressed in the order $I_1, P_1, B_1, B_2, P_2, B_3, B_4, P_3, B_5, B_6, P_4, B_7, B_8, I_2, B_9, B_{10}, \ldots$ . A set of consecutive frames that are predicted relative to a single keyframe is commonly referred to as a group of pictures (GOP).

BRIEF DESCRIPTION OF THE DRAWINGS

A further understanding of the nature and the advantages of the invention disclosed herein may be realized by reference to the remaining portions of the specifications and the attached drawings.

SUMMARY

Figure 1:
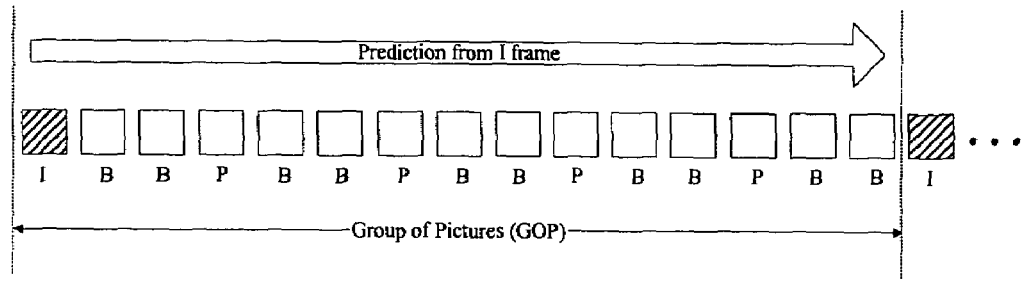
FIG. 1 illustrates forward prediction from a keyframe in the background art.

One embodiment of the invention pertains to a method for encoding and decoding a video sequence in which a keyframe is used to bi-directionally predict frames in the sequence. The keyframe is coded independently of other frames in the sequence. Both a prior frame occurring before the keyframe and a subsequent frame occurring after the keyframe are predicted using data from the keyframe.

Another embodiment of the invention relates to a method for allocating bits to a keyframe during video encoding. Effects of a plurality of keyframe bit allocations on quality of a predicted frame are measured. Said effects are used to determine a near optimal keyframe bit allocation.

DETAILED DESCRIPTION

1 Introduction and Overview

Two advances in the use of keyframes (I-frames) as reference points during the compression of a video sequence are detailed below.

The first advance involves restructuring the order in which predicted frames (P-frames) and/or bi-directionally predicted frames (B-frames) are predicted from a single keyframe. In particular, a keyframe is taken at the middle of a group of pictures (GOP) and used to predict P-frames occurring both before and after that keyframe.

The second advance involves finding an optimal allocation of bits to devote to a keyframe when the overall bit rate for the video sequence is constrained. The keyframe is initially compressed with a plurality of different bit allocations, and the predictions of the next P-frame based on each compressed keyframe are compared to determine the quality of each prediction. From this data, a keyframe bit allocation that optimizes the tradeoff between keyframe quality and the quality of resulting predicted frames is determined.

An embodiment of the present invention provides gains in the compression ratio during video compression by reducing the number of needed keyframes, or frames that are coded independently of other frames. In one embodiment, a keyframe is used to predict P-frames that occur both temporally before and temporally after the keyframe. In this way the number of frames encoded relative to each keyframe can be doubled with approximately the same quality, so that the number of keyframes required for a given quality level is halved. Since keyframes cost the most bits to encode, this added efficiency potentially reduces the number of bits needed for an encoded video sequence significantly, thereby increasing the compression ratio.

Another embodiment of the present invention provides a method for allocating bits to keyframes during video encoding. Assuming that an overall bit rate constraint is imposed on the encoded video, the expenditure of bits on the keyframes must be balanced against the use of bits to encode the various predicted frames. In one embodiment, a keyframe is compressed and decompressed with a plurality of bit allocations, and the resulting decompressed keyframes are each used to predict a first predicted frame. Each resulting predicted frame is then compared to the corresponding raw frame from the uncompressed video sequence to determine the degree to which they agree, for instance by measuring the peak signal-to-noise ratio (PSNR). These comparison values are plotted against keyframe bit allocation, and values between the discrete set of tested bit allocations are interpolated. The point on this plot at which the slope equals a predetermined value is located and the bit rate corresponding to this point is selected as the optimal bit rate at which to encode the keyframe.

2 Bi-directional Keyframe Predictions

FIG. 1 illustrates a GOP from a video sequence encoded according to the known art. An I-frame is encoded independently of other frames, and then a series of subsequent frames are encoded relative to the information encoded for that I-frame. The subsequent frames may include P-frames, which are predicted only from past frames, and B-frames, which are predicted bi-directionally from both past and future frames. The illustrated arrangement of I, B, B, P, B, B, P, B, B, P, B, B, P, B, B comprising one GOP is an arrangement that is typical in for instance the MPEG techniques for video coding (e.g. MPEG-1, MPEG-2, MPEG-4). Note that because of the presence of bi-directionally predicted frames, the order in which the compressed frame information is transmitted or stored is different from the actual order in which the frames temporally appear, as discussed in the Background section. Also, note that the final B-frames may depend on the initial I-frame of the next GOP, causing some interdependency across GOP transitions.

Figure 2:
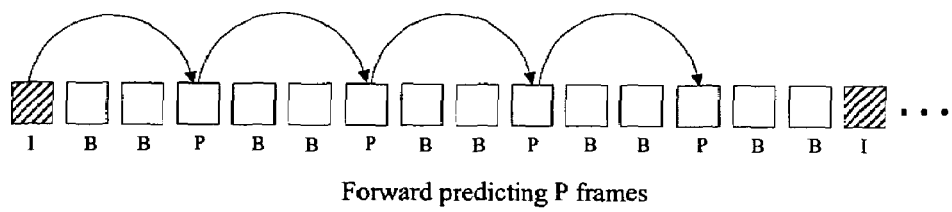
FIG. 2 illustrates the prediction of P-frames and B-frames using forward prediction from keyframes in the background art.
Figure 2:
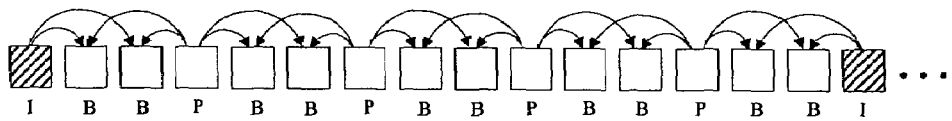

FIG. 2 clarifies the dependencies inherent in the predictive coding scheme outlined in FIG. 1a. An I-frame is used to predict a first P-frame, that first P-frame is used to predict a second P-frame, and so on until the last P-frame in the GOP is reached. (In this illustration the GOP includes four P-frames.) The B-frames are each predicted from the I- or P-frames occurring most closely before and after the B-frame. The first sequence shows the forward prediction of P-frames from the previous I- or P-frame, while the second sequence shows the bi-directional prediction of B-frames using the surrounding I- and P-frames (so predictions for B-frames may be backwards or forwards).

A key observation of this invention is that there is no inherent obstacle to predicting P-frames not only in the forward direction but also in the backward direction. Most motion compensation schemes used during predictive video coding can be adapted to work equally well in the forward or backward directions. Thus, a P-frame may be predicted not only from a preceding P- or I-frame, but also from a subsequent P- or I-frame.

Figure 3A:
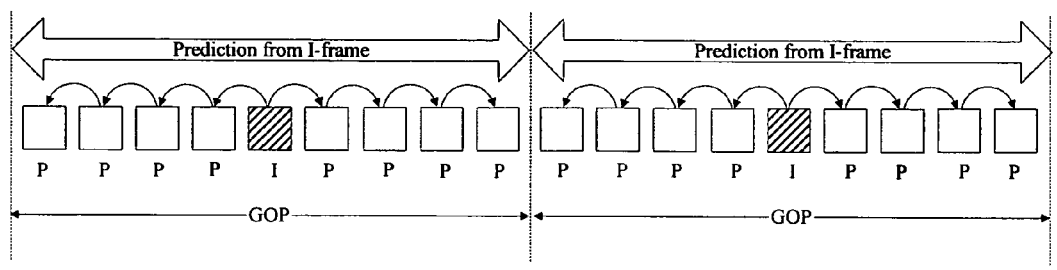
FIG. 3a illustrates the arrangement of GOPs using bi-directional prediction from keyframes in accordance with an embodiment of the invention.

FIG. 3a illustrates the concept of predicting bi-directionally from a single I-frame in accordance with an embodiment of the invention. Two GOPs from a video sequence are shown, and for each GOP the I-frame is taken to occur in the middle of the GOP. Note that in general the total number of P-frames in a GOP and the proportion of P-frames occurring before and after the I-frame may vary. P-frames extend in either temporal direction from the central I-frame. Backwards predictions are used to predict the P-frames that precede the I-frame, and forward predictions are used to predict the P-frames that follow the I-frame (in the usual manner). Note that under this conception P-frames are frames that are predicted from a single direction, but that direction need not be the forward direction (in contradistinction to the MPEG standards and other known video coding standards).

Figure 3B:
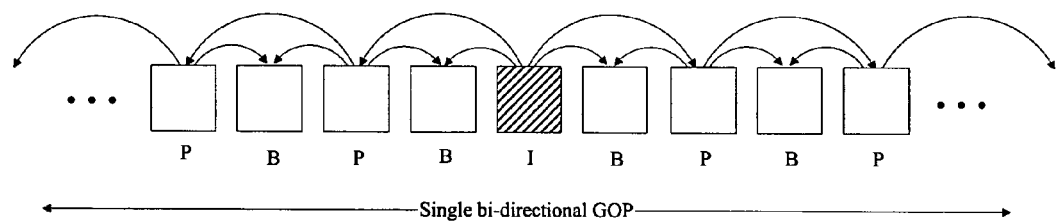
FIG. 3b illustrates a single bi-directional GOP with B-frames inserted in accordance with an embodiment of the invention.

FIG. 3b shows that B-frames may also be included in GOPs with the bi-directional P-frame prediction scheme in accordance with an embodiment of the invention. As before, the nearest preceding and subsequent I- or P-frames are used to predict B-frames bi-directionally. While FIG. 3b shows only one B-frame occurring between each pair of P-frames and each pair consisting of one I-frame and one P-frame, in general more B-frames may be inserted in these positions.

Note that because frames occurring before a given I-frame depend on the information encoded for that I-frame under this scheme, the order in which compressed frames are transmitted or stored must be altered. Since the I-frame must be decompressed before other frames in the GOP can be decompressed, some reordering will be required. Depending upon the speed at which decompression can take place, this reordering could result in some latency. However, the initial GOP for a sequence can be encoded using only forward predicts from an I-frame to reduce latency and decoding speed can be adjusted to allow unaffected playback despite the reordering of the compressed sequence.

This method of predicting bi-directionally from I-frames has the potential to double the number of frames that can be compressed relative to each I-frame. Since I-frames are significantly more expensive to encode than the predicted frames that depend on them, this doubling will lead to substantial bit savings. Alternatively, for a given encoded bit rate, more bits may be devoted to residual information for predicted frames resulting in higher perceptual quality.

The arrangement of GOPs shown in FIG. 3a leads to interfaces between GOPs consisting of predicted frames that are predicted relative to I-frames that are far apart. In lower-bit-rate scenarios, these predicted frames may be of diminished quality and in particular their errors may be divergent since they are predicted from different directions.

In this case, any of a variety of techniques for temporal or spatio-temporal smoothing or other techniques may be applied to create a more perceptually smooth transition across GOP boundaries.

3 Optimal Keyframe Bit Allocation

One problem that arises in lossy video compression is the problem of balancing bit expenditure on keyframes against bit expenditure on predicted frames. The keyframe is coded independently, while the predicted frames are typically coded using some bits for motion prediction and some bits for residue information (i.e. to improve detail of the motion prediction). This problem arises particularly in the case when the overall bit rate is fixed so that a tradeoff between keyframes and predicted frames is necessary. If too few bits are spent on a keyframe, then the dependent predicted frames rely on predictions from a shoddy reference frame. This situation may result in artifacts that persist throughout the GOP due to dependencies upon the keyframe. However, if too many bits are spent on the keyframe, then not enough bits will remain for residue coding to repair the inevitable imperfections that arise during motion compensated prediction. Thus, finding a keyframe bit allocation that optimizes this tradeoff is essential to providing highest quality video at a given compression ratio.

Figure 4:
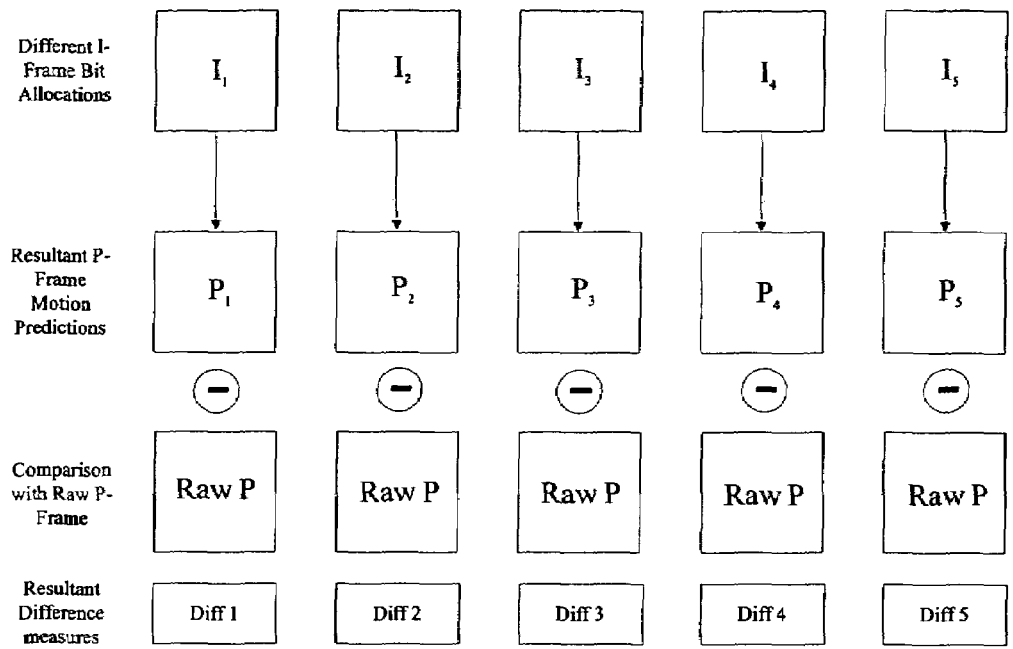
FIG. 4 illustrates the computation of quality comparison data for predicts based on a plurality of keyframe encoding bit allocations in accordance with an embodiment of the invention.

FIG. 4 illustrates a heuristic used to gather data from which an optimal keyframe bit allocation can be determined in accordance with an embodiment of the invention. The video encoder first encodes a given keyframe at a plurality of bit allocations. For example, in one embodiment the keyframe is encoded using JPEG2000 at for instance 0.1, 0.6, 1.1, 1.6, 2.1, 2.6, and 3.1 bits per pixel. In general, the technique used for keyframe encoding and the choices of bit allocations may vary. The encoder then decodes each of these encoded keyframes to produce decompressed keyframes that would be available to a decoder.

The encoder next uses each decompressed keyframe to predict the first subsequent P-frame in the sequence. Preferably at this stage the encoder only performs a motion-compensated prediction and does not carry out further steps to correct the resulting prediction. However, in general any prediction technique may be used at this step. The encoder then compares each of these first predicts to the corresponding raw frame from the uncompressed video sequence. Some measure of the success of each prediction is made so that the effectiveness of the various keyframe encoding bit allocations can be compared. In one embodiment, the peak signal-to-noise ratio (PSNR) is computed for each predicted P-frame relative to the raw frame. In FIG. 4, these comparison measures between the various predicted frames and the raw frame are called Diff 1, Diff 2, and so on.

Figure 5:
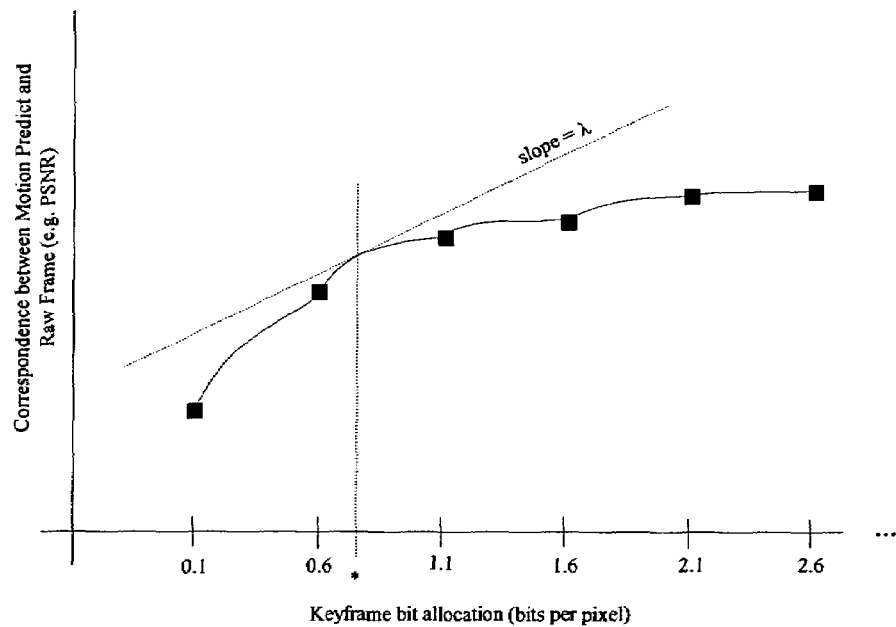
FIG. 5 illustrates a plot of prediction quality versus keyframe bit allocation and the selection of an optimal keyframe bit allocation from said plot in accordance with an embodiment of the invention.

FIG. 5 illustrates a plot of prediction qualities (e.g. PSNR values) against keyframe encoding bit allocation in accordance with an embodiment of the invention. Generally higher bit allocations for keyframe encoding result in higher prediction qualities, though the returns eventually diminish. A slope $\lambda$ is used to represent the optimal (or near optimal) tradeoff between increasing the keyframe quality and reducing the bits available for coding predicted frames. This optimal slope $\lambda$ is determined empirically. An interpolation is made between each consecutive pair of points in the quality versus bit rate plot to estimate the quality for all keyframe bit allocations within a certain range. In one embodiment, a logarithmic function of the form $A \log(x)+B$ is used to model the curve lying between each pair of data points. The point on the resulting curve having slope equal to $\lambda$ is located, and the bit allocation corresponding to this point on the curve is selected as the optimal keyframe bit allocation.

Note that this technique applies to a broad range of strategies for video encoding. In particular, it applies to all predictive coding techniques, without regard to the ordering of keyframes and P- or B-frames. The technique may be applied to MPEG coding strategies or other block-based prediction strategies. In this case, the keyframes are encoded with various bit allocations and then decoded and used to predict a first P-frame using block-based motion compensation. This technique applies equally well to segmentation-based video compression strategies.

In one embodiment, a raw keyframe is segmented and motion vectors for each segment between the keyframe and a next raw P-frame are found by some motion estimation strategy. The keyframe is then compressed with a plurality of bit allocations and then each compressed keyframe is decompressed. The motion vectors determined above are then used to construct a motion model for the next P-frame from each of the plurality of decompressed keyframes. The use of a single set of motion vectors determined from the raw keyframe and next raw P-frame saves considerable computation in this embodiment. PSNR values for each resulting P-frame motion model are then determined relative to the corresponding raw frame. The PSNR values are plotted against keyframe bit allocation and an optimal bit allocation is selected as described above. In one embodiment, when comparing the plurality of motion models for the P-frame to the corresponding raw frame, only the portions of the constructed motion models that are covered by segments displaced from the keyframe are considered.

4 Conclusion, Ramifications, and Scope

The techniques for optimal or near optimal use of keyframes disclosed herein are not restricted to one particular video coding strategy. They may be applied as enhancements to such existing strategies as MPEG-1, MPEG-2, MPEG-4, H.263, and H.264, among others. They may also be applied advantageously to segmentation-based video compression strategies, such as for instance the method for video processing disclosed in Prakash I, reference above. The method for predicting bi-directionally from keyframes effectively doubles the predictive capacity of each keyframe and thereby significantly enhances the coding efficiency, independent of the method of prediction employed. The method for allocating bits to keyframes enhances quality by achieving the best predictive results based on a keyframe within the constraint of a limited overall bit budget.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention.

While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method for encoding and decoding a video sequence in which a keyframe is used to bi-directionally predict frames in the sequence, the method comprising:

coding said keyframe independently of other frames in the sequence;

predicting a prior unidirectional predicted frame occurring before said keyframe using data from said keyframe and not from any other keyframe, directly or indirectly;

predicting a subsequent unidirectional predicted frame occurring after the keyframe using the data from said keyframe and not from any other keyframe, directly or indirectly; and bi-directionally predicting a prior intervening frame using the data from the keyframe and data from the prior unidirectional predicted frame without using data derived from any other keyframe, wherein the prior intervening frame occurs between the keyframe and the prior unidirectional predicted frame.

2. The method of claim 1, wherein the keyframe is selected from a middle of a group of pictures to be encoded.

3. The method of claim 2, wherein the method further comprises:

predicting all prior frames within the group of pictures that occur before the keyframe using data from the keyframe and not from any other keyframe.

4. The method of claim 3, wherein the method further comprises:

predicting all subsequent frames within the group of pictures that occur after the keyframe using data from the keyframe and not from any other keyframe.

5. The method of claim 1, wherein at least one subsequent intervening frame occurs between the keyframe and the subsequent unidirectional predicted frame, and wherein the method further comprises:

bi-directionally predicting the subsequent intervening frame using the data from the keyframe and data from the subsequent unidirectional predicted frame, without using data derived from any other keyframe.

6. A method for encoding and decoding a video sequence in which a keyframe is used to bi-directionally predict frames in the sequence, the method comprising:

coding said keyframe independently of other frames in the sequence;

predicting at least three prior unidirectional predicted frames occurring before said keyframe using data from said keyframe and not from any other keyframe, directly or indirectly;

predicting a plurality of subsequent unidirectional predicted frames occurring after said keyframe using the data from said keyframe and not from any other keyframe, directly or indirectly;

bi-directionally predicting a prior intervening frame using the data from the keyframe and data from a prior unidirectional predicted frame, without using data derived from any other keyframe, wherein the prior intervening frame occurs between the keyframe and the prior unidirectional predicted frame; and bi-directionally predicting a subsequent intervening frame using the data from the keyframe and data from a subsequent unidirectional predicted frame, without using data derived from any other keyframe, wherein the subsequent intervening frame occurs between the keyframe and the subsequent unidirectional predicted frame.

7. The method of claim 6, wherein the plurality of subsequent unidirectional predicted frames comprises at least three frames.

8. The method of claim 6, wherein a group of pictures consists of said keyframe, said prior and subsequent unidirectional predicted frames, and said prior and subsequent intervening frames.

* * * * *